United States Patent [19]

Schätzler

[11] 4,320,921
[45] Mar. 23, 1982

[54] SLIDING ROOF FOR MOTOR VEHICLES

[75] Inventor: Walter Schätzler, Gaunting, Fed. Rep. of Germany

[73] Assignee: Webasto-Werk W. Baier GmbH & Co., Munich, Fed. Rep. of Germany

[21] Appl. No.: 158,392

[22] Filed: Jun. 11, 1980

[30] Foreign Application Priority Data

Jun. 13, 1979 [DE] Fed. Rep. of Germany ....... 2923904

[51] Int. Cl.³ .............................................. B60J 7/04
[52] U.S. Cl. .................................. 296/213; 296/214; 296/222
[58] Field of Search ............... 296/222, 214, 213, 215, 296/224; 49/163, 168

[56] References Cited

U.S. PATENT DOCUMENTS

| 2,193,607 | 3/1940 | Votypka | 296/222 |
| 3,964,784 | 6/1976 | Prechter | 296/215 |
| 4,175,784 | 11/1979 | Schatzler | 296/214 |
| 4,257,646 | 3/1981 | Schatzler | 296/222 |

Primary Examiner—Robert R. Song
Attorney, Agent, or Firm—Craig and Antonelli

[57] ABSTRACT

A sliding roof assembly for motor vehicles comprises a translucent rigid sliding cover which covers a roof opening in its closed position and is slidable down and out of this position and behind a fixed rear roof part, a sliding headlining that is slidable relative to the sliding cover panel and jointly movable therewith, and an arrangement for automatically engaging the sliding headlining, when the sliding cover is open, for displacing the sliding headlining with the cover to an open position where they both disappear completely behind a stationary frame cover. An arrangement is also provided for returning the sliding headlining to an intermediate open position wherein a handle thereof projects out of the stationary frame cover when the sliding cover is closed. According to a feature of a preferred embodiment, ventilation of the vehicle passenger compartment can be obtained when the sliding cover is closed and the sliding cover is tilted upwardly by scoop-shaped ventilation openings provided in the sliding headlining. A further feature includes provision of interengageable releasable locking members associated with a stationary part of the roof assembly and the sliding headlining for releasably retaining the headlining in open, closed, and intermediate positions.

9 Claims, 10 Drawing Figures

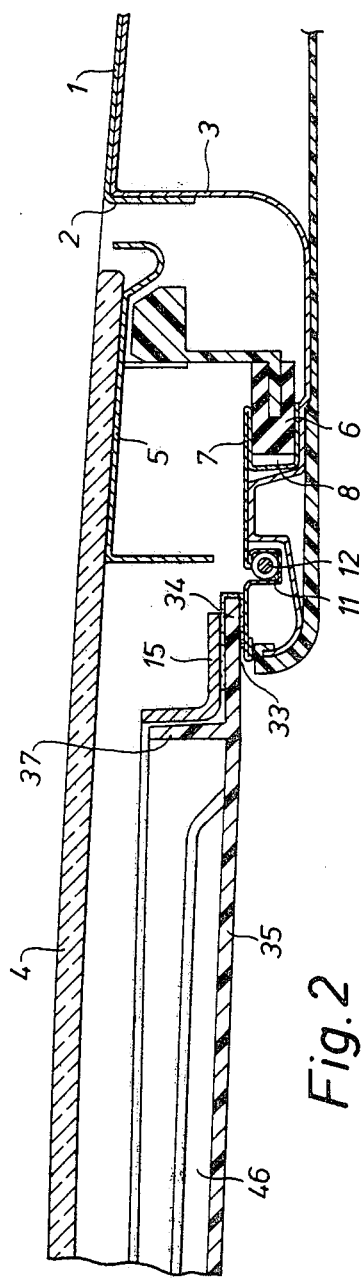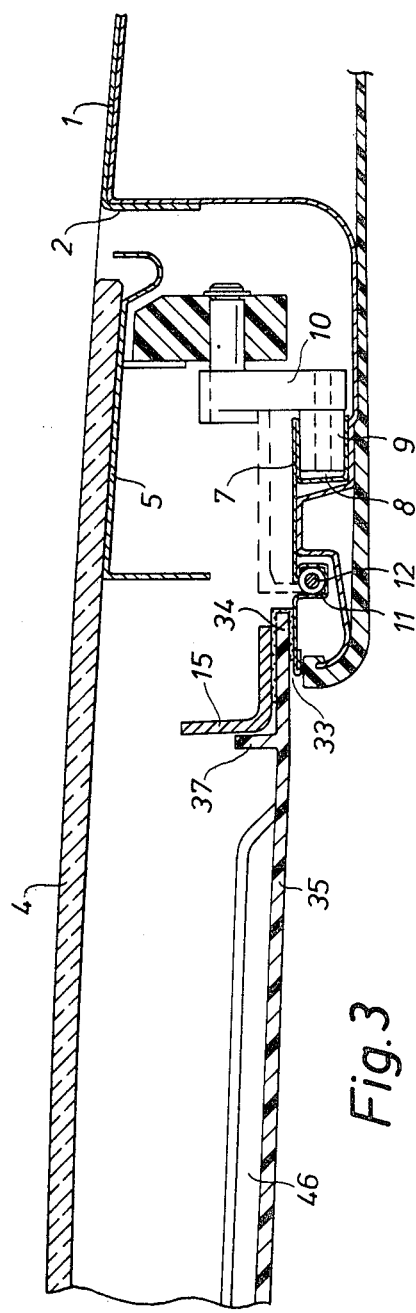

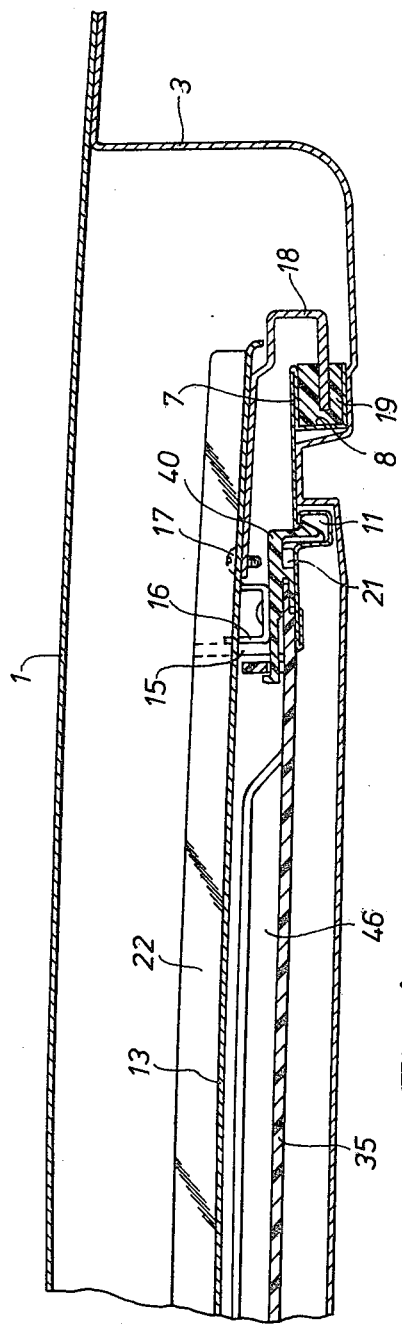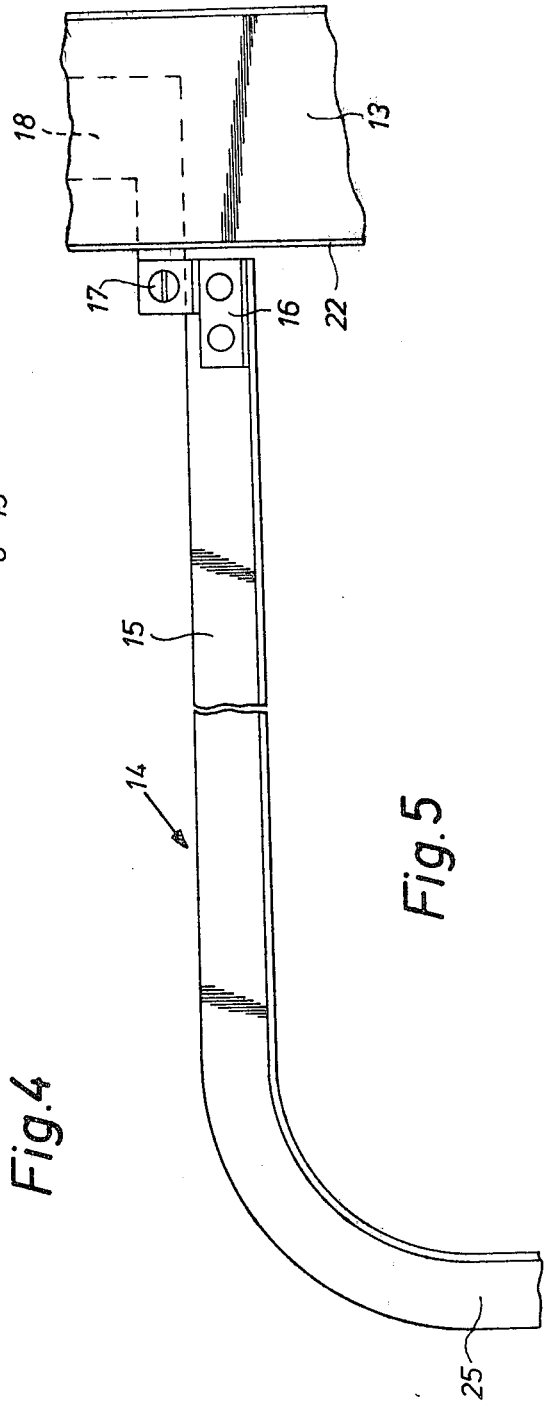

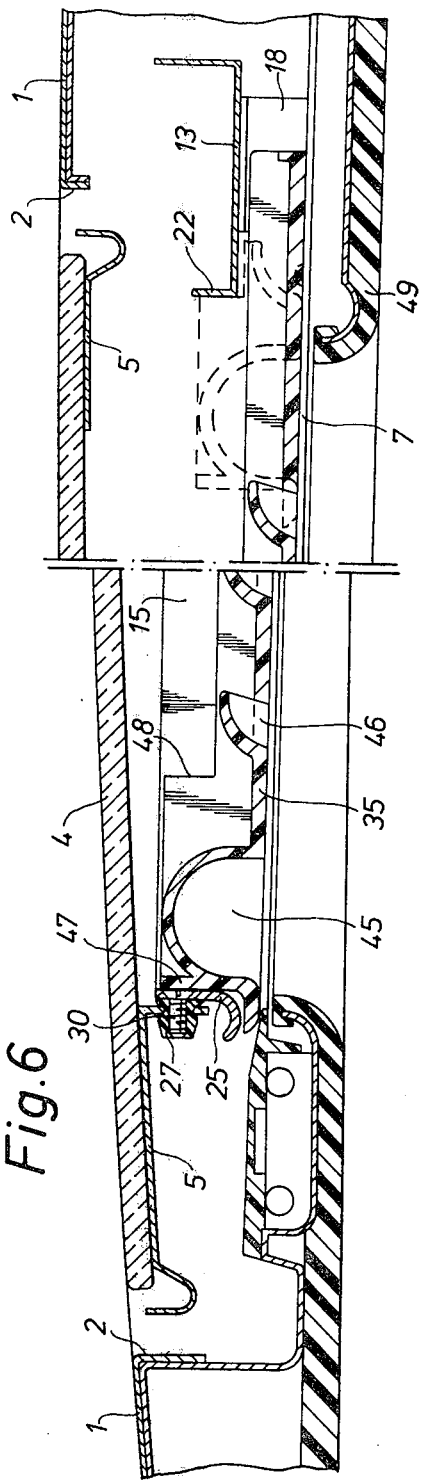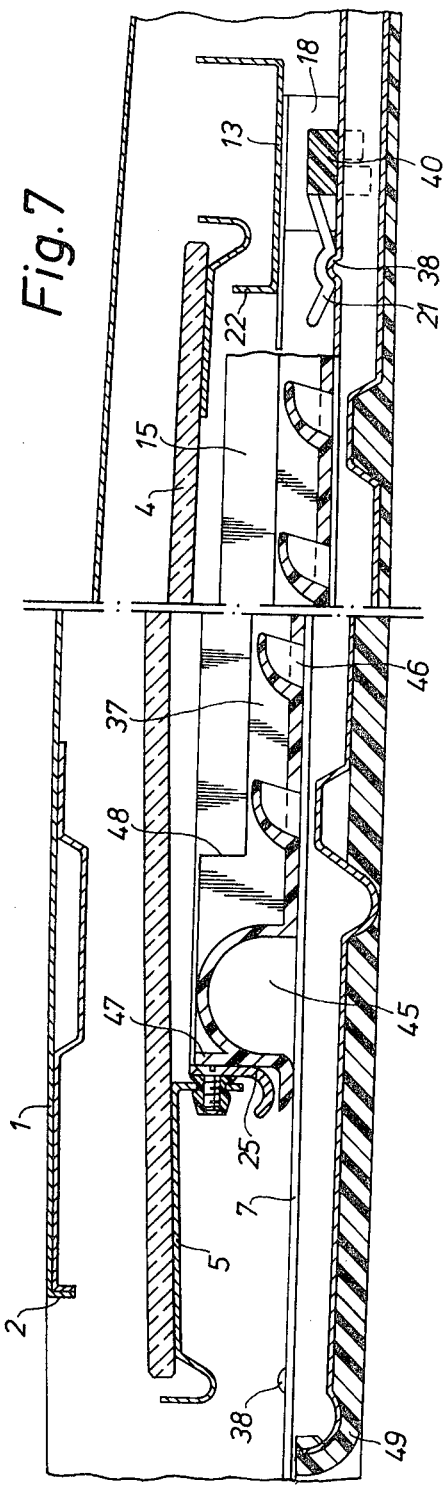

SLIDING ROOF FOR MOTOR VEHICLES

BACKGROUND AND SUMMARY OF THE INVENTION

The invention relates to a sliding roof for motor vehicles with a translucent rigid sliding cover, said cover closing a roof opening in its closed position, said sliding roof further being lowerable from the roof opening and slidable beneath the fixed rear roof part, and being associated with a sliding headlining which participates in the opening movements of the sliding cover.

In known sliding roofs of this design (German Utility Model No. 1,764,915 and U.S. Pat. Nos. 3,964,784 and 2,193,607) the sliding headlining is carried backward when the sliding cover is opened but not to the full extent of the opening, the headlining stopping at a point where it can just be gripped by the hand. However, this necessarily means that a considerable part of the roof opening is blocked to viewing.

In U.S. Pat. No. 4,175,784, with respect to which the present inventor is a co-inventor, a sliding roof is disclosed in which the sliding cover carries a sliding headlining backward when the cover is opened in a manner whereby the sliding headlining completely disappears behind a stationary frame cover. However, the sliding cover of this patent is arranged so as to only be slidably opened and is not constructed so as to be tiltable in a manner positioning its rear edge above a fixed roof part. Furthermore, in the construction according to this patent, a forward edge portion of the sliding cover is exposed in its fully retracted position and obstructs a portion of the roof opening.

The present invention is intended as a further development of the above-noted prior art sliding roofs. In particular, the present invention seeks, as objects thereof, to present a new approach to the displacement of sliding covers and headlinings of the type wherein the sliding headlining is slidable relative to the slidable cover and jointly movable therewith which will enable the following possibilities:

1. To permit great utilization of sliding headlinings in a manner where it disappears completely from the roof opening to a position behind a stationary frame cover such as in sliding roofs wherein the sliding cover is mounted for upward tilting of its rear edge as well as rearward sliding and/or wherein the sliding cover as well as the headlining disappear behind the stationary frame cover;

2. To provide a construction for enabling automatic disappearance of the sliding headlining during opening of the sliding covering in a manner that does not interfere with manual displacement thereof independent of the sliding cover in a simple manner that is readily adaptable to known sliding roof constructions with a minimum number of modifications and maximum utilization of existing parts thereof.

These objects are achieved in accordance with preferred embodiments disclosed herein which, among other features, enable the sliding cover to completely disappear in a manner which may permit full utilization of the roof opening through the use of an automatic follower arrangement that can be displaced by engaging projections rigidly coupled to the sliding cover or by a displaceable gutter coupled to the sliding cover for movement therewith.

In order to be able to close the sliding headlining by hand if desired, with the sliding cover closed, in another embodiment of the invention the sliding headlining is coupled with the sliding cover when the latter is closed by means of a return device for movement to a position wherein the sliding headlining projects out of the frame covering. The return device can be formed in an especially simple fashion from the design standpoint by a water gutter which participates in the sliding movements of the sliding cover and a stop on the sliding headlining which is engageable therewith, or by a sliding cover mounting frame and the forward edge of the sliding headlining which is engageable therewith.

The sliding roof according to the invention can be designed to a known fashion as a sliding and tilting roof. In this case, the sliding cover can optionally be tilted above the fixed rear roof part at its rear edge, and the sliding headlining is provided with ventilation openings in order to permit ventilation through the tilted sliding roof even when the sliding headlining is closed.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a partial cross section through the forward part of the sliding roof along line II—II in FIG. 1;

FIG. 3 is a partial cross section through the rear part of the sliding roof along line III—III in FIG. 1;

FIG. 4 is a partial cross section through the water gutter which moves together with the sliding cover, in the rear part of the sliding roof, along line IV—IV in FIG. 1;

FIG. 5 is a partial top view of the shield and the gutter;

FIG. 6 is a lengthwise section through the closed sliding roof along line VI—VI in FIG. 1;

FIG. 7 is a partial lengthwise section through the open sliding roof along line VI—VI in FIG. 1;

DETAILED DESCRIPTION OF THE PREFERRED EMBODIMENTS

Figure 1:
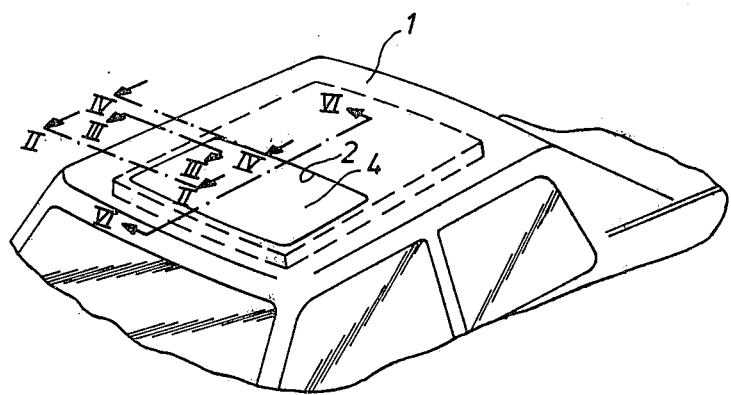
FIG. 1 is a schematic perspective partial view of a vehicle equipped with a sliding and tilting roof.

A roof opening 2 is formed in a fixed roof part 1, said opening 2 being surrounded by a frame 3 and closable by a translucent rigid sliding cover 4. The edges of sliding cover 4 are surrounded by a mounting frame 5. Sliding shoes 6 are mounted on mounting frame 5 near the forward edge of the sliding cover 4 on both sides, said shoes engaging lateral tracks 7 mounted on frame 3 (FIG. 2). In the vicinity of its rear edge, the sliding cover is articulated on both sides to guide slides which are guided by sliding shoes 9 in a slide shoe channel 8 formed by tracks 7, and connected with the mounting frame 5 by operating lever 10. The guide slides are displaceable manually or by means of a motor through incompressible cables 12, said cables running in cable channels 11 in tracks 7. The functional elements for sliding and tilting sliding cover 4 do not form any part of the present invention and are therefore not described in greater detail. They can be designed in a manner which would be conventional for an individual skilled in the art. Similarly, while the roof is shown in its closed position in FIGS. 2, 3 and 6 with a clearance gap between a free edge of mounting frame 5 and roof frame 3, in practice a sealing member, such as that shown in the commonly assigned U.S. patent application Ser. No. 144,277, entitled "Rigid Cover for Vehicle Roofs" and filed by the present applicant as co-inventor with Hans Jardin on Apr. 28, 1980, is mounted on this free edge to provide a leak-free juncture with frame 3 in the closed position.

A gutter 13 is provided which participates in all of the sliding movements of sliding cover 4. Gutter 13 can be connected for this purpose by rods, not shown and in a manner known per se (see for example commonly assigned U.S. patent application Ser. No. 139,263, filed Apr. 11, 1980, entitled "Vehicle Roof" of which the present invention is a co-inventor), with mounting frame 5 of sliding cover 4. A shield 14, which is essentially U-shaped and is made of aluminum, for example, runs along the side edges and the forward edge of sliding cover 4, in order to protect the functional elements of the sliding roof. The lateral legs 15 of the shield are each riveted at their rear ends to mounting arms 16, said arms being releasably connected with a sliding shoe support 18 by means of a screw 17. Sliding shoe support 18 is spot-welded to gutter 13 and is guided by a sliding shoe 19 in sliding-shoe channel 8. A forward rib 25 of shield 14 is connected by a plastic part 27 and screws 30 with mounting frame 5 for sliding cover 4.

The lateral legs 15 of shield 14, together with tracks 7, delimit guide channels 33. Lateral edges 34 of a rigid sliding headlining 35, made of opaque material, preferably plastic, run in these guide channels. Laterally positioned, projecting rub rails 37 on the sliding headlining (FIG. 3) are arranged so that they will be closely adjacent shield legs 15 and thereby serve for lateral guidance of the headlining.

Tracks 7 are provided with at least two bumps 38 (FIG. 7), which, with sliding headlining 35 in the closed position or the fully open position, engage a locking nose 21 of a part 40 which is connected with the sliding headlining, in order in this fashion to hold the sliding headlining releasably in the corresponding position. The locking nose resiliently presses against tracks 7 with sufficient force to hold headlining 35 as cover 4 continues its movement, while being flexible enough to disengage when a user pulls handle 45 to close the headlining. Rigid sliding headlining 35 is provided with a recessed handle 45 in the vicinity of its forward edge. Ventilation slots 46 extend at regular intervals over practically the complete width of the sliding headlining and are preferrably scoop-shaped as shown to allow maximum ventilation without exposing the vehicle interior to direct sunlight from above.

When sliding cover 4 assumes its closed position (FIGS. 2, 3, and 6), sliding headlining 35 can be moved freely by means of handle 45, manually between the closed position shown in FIG. 6 by a solid line and an open position, indicated on the right-hand side of FIG. 6 by dashed lines. In the closed position, forward edge 47 of sliding headlining 35 abuts the forward rib 25 of shield 14. The open position of the sliding headlining is delimited, with sliding cover 4 in its closed position, by the fact that a stop 48 on the sliding headlining strikes leg 22 of gutter 13 which is connected with sliding cover 4 (at the right in FIG. 6). When the sliding cover is opened (FIG. 7), shield 14 together with its rib 25 carries sliding headlining 35 with it until it disappears completely behind the stationary cover 49 on the frame (FIG. 7). When sliding cover 4, beginning in the open position, is moved forward, the gutter together with its leg 22 strikes stop 48 of sliding headlining 35 and transports the latter to the position shown on the right-hand side of FIG. 6, where they disengage due to the resistance offered by engagement of lock nose 21 with bumps 38. In this position, handle 45 is accessible. Sliding headlining 35 remains fixed as sliding cover 4 continues its closing motion. Then, if desired, it in turn can be closed by hand.

Figure 8:
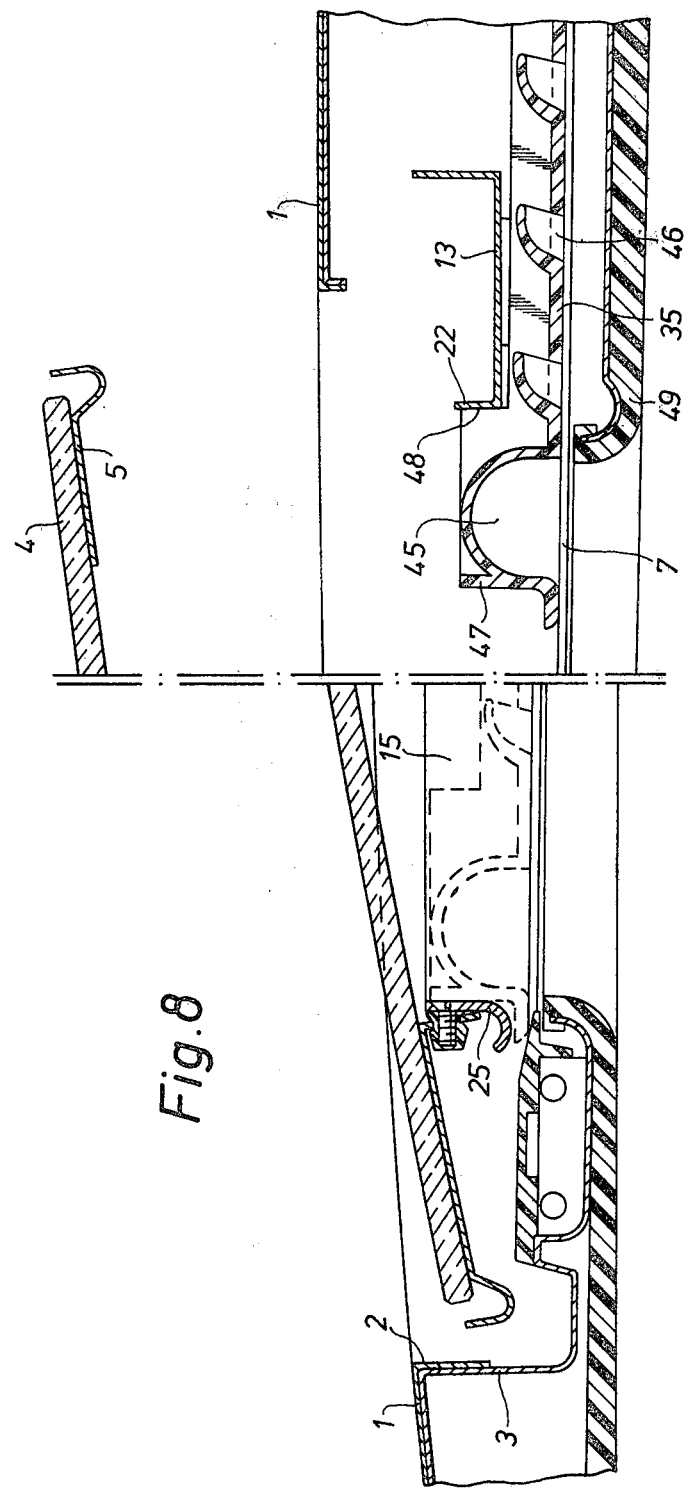
FIG. 8 is a partial lengthwise section through the tilted sliding roof along line VI—VI in FIG. 1.

Starting in the closed position, sliding cover 4 can optionally be brought into the tilted position shown in FIG. 8 instead of the slid-back position of FIG. 7. In this case, sliding headlining 35 is likewise displaceable between the open and closed positions, in which it abuts the forward rib 25 of shield 14 or leg 22 of gutter 13 manually by means of handle 45, the closed position of the headlining being shown by dashed lines at the left of FIG. 8, and its open position by solid lines on the right.

Figure 9:
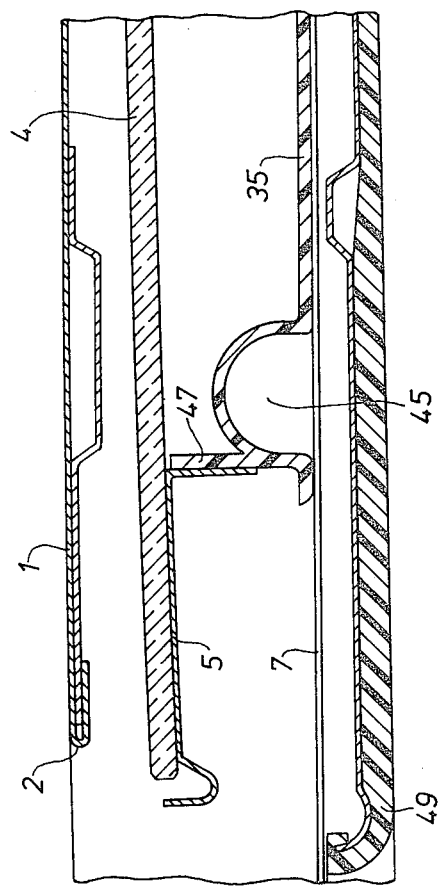
FIG. 9 is a partial lengthwise section similar to the left-hand part of FIG. 7 for a modified embodiment of the invention.
Figure 10:
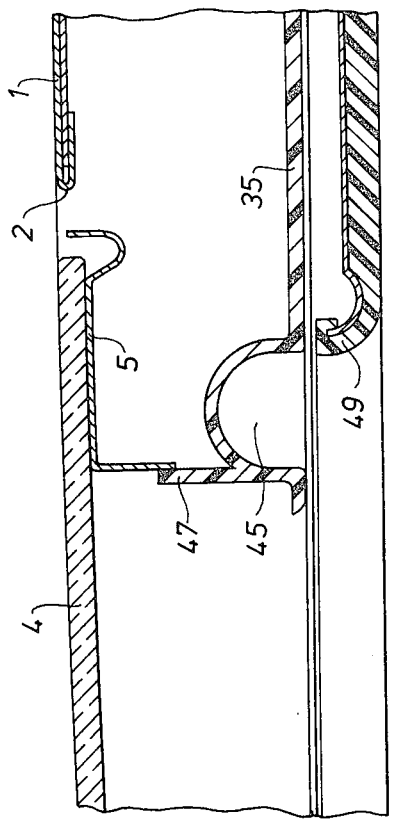
FIG. 10 is a partial lengthwise section similar to the right-hand side of FIG. 6 for the modified embodiment.

A modified embodiment is shown in FIGS. 9 and 10 and differs from the embodiment described above only in that entrainment of the sliding headlining 35, when sliding cover 4 is opened is accomplished by the forward part of sliding cover mounting frame 5 abutting the forward side of headlining forward edge 47, while as sliding cover 4 is closed, sliding headlining 35, by virtue of engagement between the rear part of mounting frame 5 and the rear side of the forward edge 47 of the headlining is brought back into a position (FIG. 10) in which handle 45 is once again is accessible.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Sliding roof assembly for motor vehicles comprising a translucent rigid sliding cover, said cover closing a roof opening in its closed position and being slidable down and out of this position and behind a fixed rear roof part, a sliding headlining, said sliding headlining being slidable relative to said sliding cover and jointly movable with said sliding cover, first engagement means for automatic engagement of the sliding headlining, when said sliding cover is opened, and for displacing said sliding headlining with said cover to an open position, where said sliding headlining disappears completely behind a stationary frame cover, second engagement means for automatic engagement of the sliding headlining, when the sliding cover is closed, and for transport of said sliding headlining to an intermediate open position in which the sliding headlining projects out of said stationary frame cover, said first and second engagement means being rigidly connected to said sliding cover and downwardly projecting therefrom.

2. Sliding roof assembly according to claim 1, wherein said first and second engagement means are engageable with the forward side and the rear side respectively of a leading edge of said sliding headlining.

3. Sliding roof assembly according to claim 1, wherein said first and second engagement means are defined by a sliding cover mounting frame.

4. Sliding roof assembly for motor vehicles comprising a translucent rigid sliding cover, said cover closing a roof opening in its closed position and being slidable down and out of this position and behind a fixed rear roof part, a sliding headlining, said sliding headlining being slidable relative to said sliding cover and jointly movable with said sliding cover, first engagement means for automatic engagement of the sliding headlining, when said sliding cover is opened, and for displacing said sliding headlining with said cover to an open position where said sliding headlining disappears completely behind a stationary frame cover, second engagement means for automatic engagement of the sliding headlining, when the sliding cover is closed, and for transport of said sliding headlining to an intermediate open position in which the sliding headlining projects out of said stationary frame cover, wherein said second engagement means comprises a stop on the sliding headlining which is engageable with a gutter that participates in sliding movements of the sliding cover.

5. Sliding roof assembly according to one of claim 1 or 2 or 3 or 4, wherein said sliding cover is tiltable so as to position its rear edge above said fixed rear roof part, and the sliding headlining is provided with ventilation openings for an enabling air to pass therethrough when said cover is tilted and said headlining is in a closed position.

6. Sliding roof assembly according to claim 1 or 2 or 3 or 4, wherein said sliding headlining is provided with handle means for manual displacement thereof, said handle means being exposed from said stationary frame cover during movement of said sliding cover from said open position to said closed position.

7. Sliding roof according to claim 4, wherein said sliding headlining is provided with a handle for manual displacement thereof and said stop is positioned rearwardly of said handle.

8. Sliding roof according to claim 1 or 4, wherein said sliding cover is operable to be displaced so as to completely disappear behind said stationary cover with said sliding headlining.

9. Sliding roof according to claim 1 or 4, wherein said sliding cover is mounted for tilting so as to position its rear edge above said fixed roof part.

* * * * *